UNITED STATES PATENT OFFICE.

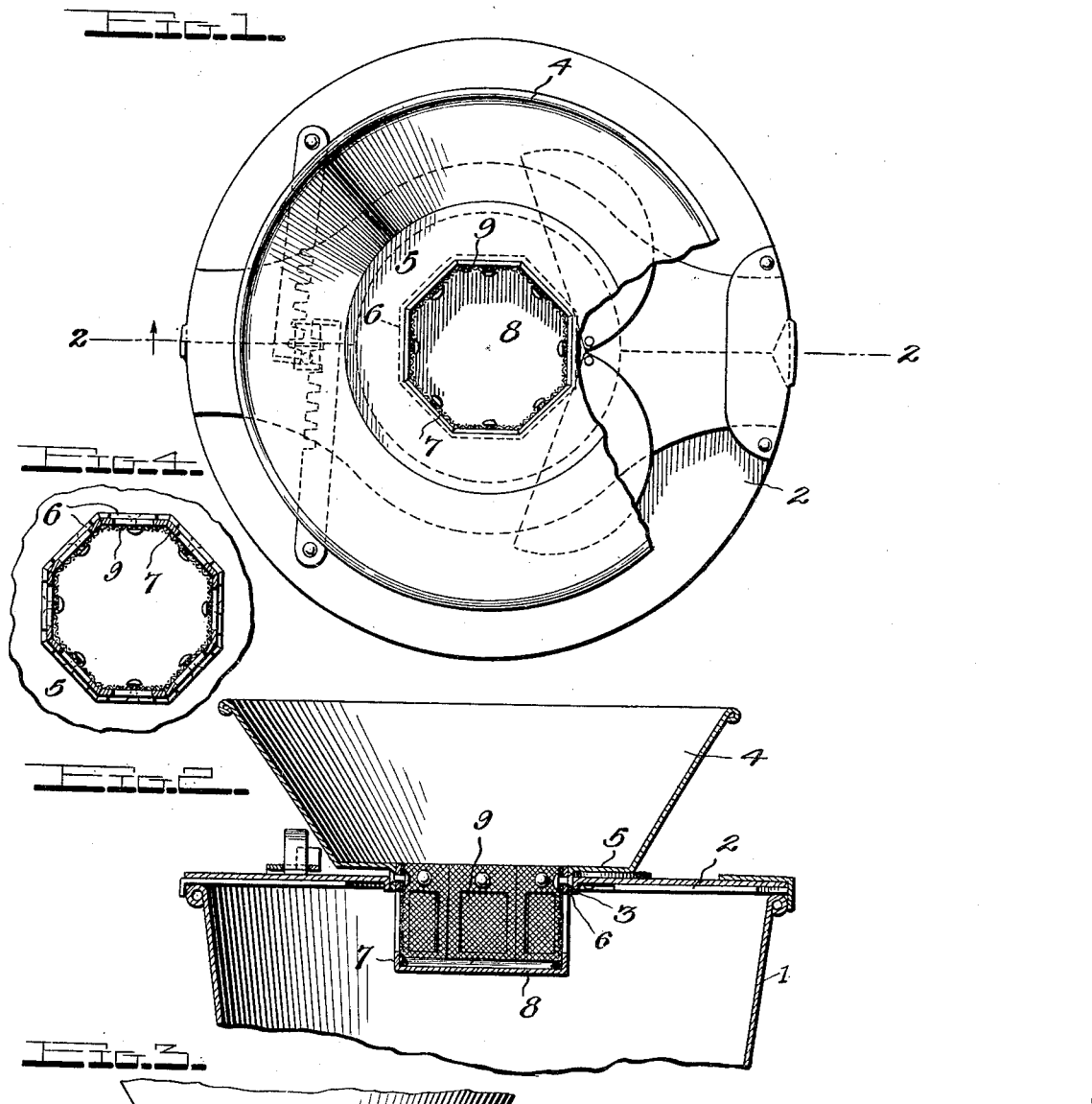

JOHN G. FRIBERG, OF MAIDEN ROCK, WISCONSIN, ASSIGNOR OF ONE-THIRD TO GEORGE E. BRASINGTON, OF MAIDEN ROCK, WISCONSIN, AND ONE-THIRD TO OSCAR H. ANDERSON, OF PLUM CITY, WISCONSIN.

STRAINER.

1,125,831.  Specification of Letters Patent.  Patented Jan. 19, 1915.

Application filed September 10, 1914. Serial No. 861,105.

*To all whom it may concern:*

Be it known that I, JOHN G. FRIBERG, a citizen of the United States, residing at Maiden Rock, in the county of Pierce and State of Wisconsin, have invented certain new and useful Improvements in Strainers; and I do declare the following to be a full, clear, and exact description of the invention, such as will enable others skilled in the art to which it appertains to make and use the same.

This invention relates to new and useful improvements in strainers and more particularly to strainers for removing impurities from milk as the same is emptied into large cans or receptacles and the primary object of the invention is to provide a means for positively straining the milk and removing all foreign matter therefrom.

A further object of the invention resides in providing a chamber on the strainer for receiving the foreign matter, said chamber being so constructed as to prevent all matter contained therein from passing out with the passage of the fluid therethrough.

A still further object resides in providing a device which is simple and durable in construction, inexpensive to manufacture and one which will be very efficient in use.

With these and other objects in view, the invention consists in the novel features of construction, combination and arrangement of parts as will be hereinafter referred to and more particularly pointed out in the specification and claims.

In the accompanying drawing forming a part of this application:—Figure 1 is a plan view, with parts broken away, showing a device constructed in accordance with my invention and applied to use; Fig. 2 is a vertical section therethrough as seen on line 2—2 of Fig. 1; Fig. 3 is a detail elevation thereof showing the chamber on the strainer; and, Fig. 4 is a horizontal section therethrough as seen on line 4—4 of Fig. 3.

In describing the invention I shall refer to the drawing in which similar reference characters designate corresponding parts throughout the several views and in which 1 indicates a receptacle to which is applied an improved cover or top 2 which is not described in detail as it forms no part of this invention. This top or cover 2 for the receptacle has a central opening 3 therein which is preferably polygonal in design, in this instance octagonal but which may be of any other desired shape.

My improved strainer consists of a funnel-shaped body 4 the bottom portion 5 of which has a central opening therein which is polygonal shaped and preferably corresponds with the design of the opening 3 in the top 2, it being important however that it be polygonal for a purpose to be described.

The edges of this opening in the bottom 5 are provided with depending flanges 6 which are struck out from the bottom of the member 4 and to which are riveted or otherwise permanently secured the upper ends of rectangular frame-like walls 7 united to form the side walls of a cup-like strainer member 8. This member 8 forms a chamber which depends from the bottom 5 of the funnel shaped body 4 and the walls 7, as stated above, are frame-like, the openings being covered by a wire mesh 9 which forms the straining medium of the device. In the formation of this cup-like member 8, the walls 7 thereof are preferably formed individually, being integral with the bottom of this cup member 8, and struck out of a single blank and the walls 7 bent upwardly at right angles to the bottom, as shown in Fig. 2. The cup-shaped member is of a design similar to the design of the opening 3 in the member 2. When these frame-like walls 7 are disposed in their upright positions the edges thereof will abut one another and the same may be welded, soldered or otherwise similarly secured together to form water-tight joints therebetween. This cup shaped member 8 which depends from the bottom 5 on the funnel or the like, as stated above, provides a strainer having a chamber at the lower end thereof in which is received all foreign particles and extraneous matter in the fluid which is passed therethrough.

In the application of the device, the strainer is applied to the top 2 which is mounted on the receptacle 1. The cup-shaped depending member 8 of the strainer being of polygonal design similar to the opening 3 in the top 2, may be readily received in said opening to depend within the receptacle. When properly positioned with respect to said receptacle, the lower straining portion of the strainer proper is entirely disposed within the receptacle and as the fluid is emptied into the funnel shaped body the same will flow to the cup-shaped lower portions 8 thereof and strain through the walls 7 thereof. All extraneous matter will settle in the bottom of this cup-shaped member 8 which is so designed as to provide flanges or short walls around the bottom thereof and the fluid which is strained through the walls will enter the receptacle 1 free from all extraneous matter.

The device will be seen to consist of a funnel-shaped body having straight-depending flanges struck up from its lower edge, thereby forming a polygonal-shaped opening in the bottom of said body, and a cup-shaped member which is struck out of a single blank, with its walls at right angles to the bottom, said walls being riveted near their top to the depending flanges of the funnel-shaped body. There are wire mesh covered openings in the walls of the cup member for straining, as before described. This provides a simple, inexpensive and durable device, the construction involving the fact that wings or flanges are struck up from the funnel thereby forming a polygonal-shaped attaching means for the walls of the cup member, the same being obviously of a far greater utility than that of a cast or pressed funnel having circular connection with a strainer cup.

From the foregoing it will be seen that I have provided an improved strainer which will positively remove all foreign and extraneous matter from fluid which is passed therethrough and it will further be seen that a chamber or the like is provided on the receptacle for receiving these foreign particles so that the latter may be emptied from the device at the will of the operator.

It will further be seen that the device is one which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to, within the scope of the appended claims, without departing from the spirit or sacrificing any of the principles of the invention.

Having thus described my invention, what I claim is:

1. A strainer comprising a funnel-shaped body having a polygonal opening in the bottom thereof, said polygonal opening being formed by depending integral flanges struck up from the bottom of said body, a cup-shaped member corresponding in cross section to the outline of said opening and having integral struck-up sides secured at their upper edges to said flanges, said member having an imperforate bottom and its side walls provided with enlarged openings, said walls and bottom being integral, and a straining material applied over the openings of said walls.

2. A strainer comprising a funnel-shaped body having a polygonal opening in the bottom thereof, said polygonal opening being formed by depending integral flanges struck up from the bottom of said body, a cup-shaped member having integral struck-up sides corresponding in cross sectional shape to the outline of the opening in the body, and secured adjacent its upper edges to said flanges, the walls of said cup-shaped member being each provided with an opening, and a wire mesh applied to the inner faces of the walls of said cup-shaped member.

In testimony whereof I have hereunto set my hand in presence of two subscribing witnesses.

JOHN G. FRIBERG.

Witnesses:
R. H. CARPENTER,
F. W. CARPENTER.

Copies of this patent may be obtained for five cents each, by addressing the "Commissioner of Patents, Washington, D. C."